United States Patent
Bolden et al.

(10) Patent No.: US 10,043,217 B1
(45) Date of Patent: Aug. 7, 2018

(54) SYSTEMS AND METHODS FOR QUOTING MULTIPLE HOMEOWNER INSURANCE PRODUCTS

(71) Applicant: STATE FARM MUTUAL AUTOMOBILE INSURANCE COMPANY, Bloomington, IL (US)

(72) Inventors: Philip Christopher Bolden, Bloomington, IL (US); Erin Corbin, Bloomington, IL (US); Sajay Sadasivan, Normal, IL (US); Bernardo Bracero, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 461 days.

(21) Appl. No.: 14/598,635

(22) Filed: Jan. 16, 2015

Related U.S. Application Data

(60) Provisional application No. 62/069,041, filed on Oct. 27, 2014.

(51) Int. Cl.
  *G06Q 40/08* (2012.01)
  *G06Q 30/06* (2012.01)
(52) U.S. Cl.
  CPC ......... *G06Q 40/08* (2013.01); *G06Q 30/0611* (2013.01)
(58) Field of Classification Search
  CPC ...................................................... G06Q 40/08

(Continued)

(56) References Cited

U.S. PATENT DOCUMENTS

| | | | |
|---|---|---|---|
| 8,543,430 B1* | 9/2013 | Fields ................... | G06Q 40/08 705/2 |
| 2010/0042442 A1* | 2/2010 | Seitomer ............... | G06Q 40/08 705/4 |

(Continued)

OTHER PUBLICATIONS

Farmers Fast Quote, https://www.farmers.com/quote/ffq4/homequote.jsf?windowid=1395169019116, retrieved from the internet on Mar. 18, 2014, 2 pages.

*Primary Examiner* — Robert R Niquette
*Assistant Examiner* — Liz P Nguyen
(74) *Attorney, Agent, or Firm* — Marshall, Gerstein & Borun LLP; Randall G. Rueth

(57) ABSTRACT

Methods and systems for creating and presenting multiple insurance product offerings are provided. According to certain aspects, an insurance provider may receive data including customer demographic information and property information, and determine two or more insurance product offerings with quotes based upon the received data or upon a single request for an insurance product offering. The provider may then send, via a computer network, data to enable a client computing device to display, in a single graphic representation, the two or more insurance product offerings and/or summaries of each. The insurance product offerings may relate to homeowners insurance, and the summary of each insurance product offering may include a premium, discount, and an icon that allows customization. Each summary may also include coverage amounts, liability coverage, personal belonging coverage, and/or additional coverage options. A side-by-side comparison of the insurance products offered may facilitate efficient and informed review by a customer.

12 Claims, 9 Drawing Sheets

(58) Field of Classification Search
USPC .............................................................. 705/4
See application file for complete search history.

(56) References Cited

U.S. PATENT DOCUMENTS

2014/0172471 A1* 6/2014 Cianciarulo ........... G06Q 10/10
  705/4
2014/0304011 A1* 10/2014 Yager ..................... G06Q 40/08
  705/4

* cited by examiner

400

CUSTOMER INFORMATION

NAME: ☐
AGE: ☐
DEMOGRAPHICS: ☐
OTHER: ☐

[SUBMIT] — 402

← 410

ADDITIONAL QUOTE INFORMATION

PERIOD: ☐
OTHER LINES: ☐
TIME OWNED: ☐
OTHER: ☐

[SUBMIT] — 404

← 420

HOUSEHOLD INFORMATION

BUILT: ☐
SIZE: ☐
ROOF TYPE: ☐
SIDING TYPE: ☐
ADDRESS: ☐
OTHER: ☐

[SUBMIT] — 406

Search 🔍

Insurance   Finances   Claims   Customer Care   My Accounts

Your Progress

Homeowners Quote    502a
① Welcome
② Personl Information
③ Home Information    502b
④ Estimated Replacement Cost
⑤ Product Selection
⑥ Quote Homeowners Application Your Agent
(change)
Jonathan Smith
(999) 999-9999

Insurance, Bank, Mutual Funds
Email Agent
Visit Site
+ Agent Details

STEP 5 OF 5 — 502
Product Selection

Homeowners Standard: Provides Homeowners Insurance for your dwelling, personal property, and personal liability. In case of a covered loss, the Homeowners Standard policy will pay the full replacement cost for both your dwelling and your personal property (subject to the policy limits and exclusions).

Homeowners Basic: Provides Homeowners Insurance for your dwelling, personal property, and personal liability. The Homeowners Basic policy offers less coverage than the Homeowners Standard policy at a lower price.

For more information on the differences between the two products, see the table below or contact your agent.

( Different )  indicates the differences in products.

500a                              500b

| Homeowners Standard | Homeowners Basic |
|---|---|
| 504a | 504b |
| $323.21/ mo | $258.57/ mo |
| $3,878.51 annually | $3,102.80 annually |
| Select & Customize — 510 | Select & Customize — 510 |
| [$] Annual discount: $1,137.97 / 12 mo | [$] Annual discount: $910.38 / 12 mo |

504

506

Protection for Your Home — 512
Dwelling Coverage — 508
( Different )

| STANDARD | BASIC |
|---|---|

Detached Structures

| STANDARD | BASIC |
|---|---|

Option ID ( Different )

| STANDARD    508 | BASIC |
|---|---|

Loss Settlement — 508
( Different )

| STANDARD | BASIC |
|---|---|

512e — Roof Surface Loss Settlement
(Different)
STANDARD          BASIC

512f — Loss of Use - Additional Living Expense
STANDARD          BASIC

512g — Loss of Use - Rental Value
(Different)
STANDARD          BASIC

514 — Deductibles
(Different)
Pollicy Deductible
(Different)
STANDARD          BASIC 516 — Other Home Coverages
516a — Trees/Shrubs
(Different)
STANDARD          BASIC 516b — Power Interruption
(Different)
STANDARD          BASIC 516c — Collapse
(Different)
STANDARD          BASIC 516d — Lock Rekeying
(Different)
STANDARD          BASIC 518 — Protection for you

*FIG. 5B*

| | |
|---|---|
| 518a — Personal Liability | |
| STANDARD | BASIC |
| 518b — Medical Payments | |
| STANDARD | BASIC |
| 520 — Protection for your Personal Property | |
| 520a — Personal Property ⟨Different⟩ | |
| STANDARD | BASIC |
| 520b — Loss Settelement Option for Personal Property ⟨Different⟩ | |
| STANDARD | BASIC |
| 522 — Increasing Your Coverage Limits | |
| 522a — Home Computers | |
| STANDARD | BASIC |
| 522b — Jewelry & Furs ⟨Different⟩ | |
| STANDARD | BASIC |
| 522c — Silverware & Goldware | |
| STANDARD | BASIC |
| 522d — Business Property ⟨Different⟩ | |
| STANDARD | BASIC |
| 522e — Building Ordinance or Law ⟨Different⟩ | |

*FIG. 5C*

| | STANDARD | BASIC |
|---|---|---|
| 522f — Firearms | | |
| | STANDARD | BASIC |
| 524 — Other Personal Property Coverages | | |
| 524a — Damage to Refrigerated Products | *Different* | |
| | STANDARD | BASIC |
| 524b — Sudden or Accidental Damage from Electrical Current | *Different* | |
| | STANDARD | BASIC |
| 524c — Tools | *Different* | |
| | STANDARD | BASIC |
| 524d — 2, 3, 4, Wheeled Vehicle | *Different* | |
| | STANDARD | BASIC |
| 526 — Additional Coverage Options | | |
| 526a — Back Up Sewer Drain | *Different* | |
| | STANDARD | BASIC |
| 526b — Vacancy | *Different* | |
| | STANDARD | BASIC |
| See complete list of additional coverages | | |
| 528 — Your Quote | | |
| | Homeowners Standard $323.21 / mo $3,878.51 annually [Select & Customize] [$] Annual discount: $1,137.97 / 12 mo | Homeowners Basic $258.57 / mo $3,102.80 annually [Select & Customize] [$] Annual discount: $910.38 / 12 mo |

*FIG. 5D*

SYSTEMS AND METHODS FOR QUOTING MULTIPLE HOMEOWNER INSURANCE PRODUCTS

CROSS-REFERENCE TO RELATED APPLICATIONS

The present application claims the benefit of U.S. Provisional Application No. 62/069,041 filed on Oct. 27, 2014, the disclosure of which is incorporated herein by reference in its entirety for all purposes.

FIELD OF THE DISCLOSURE

The present disclosure generally relates to quoting and purchasing insurance products in a computer network environment and, more particularly, to systems and methods for quoting multiple homeowner insurance products to a customer for purchase in either an online or mobile computing environment.

BACKGROUND

Homeowner insurance provides financial protection against losses due to damage to one's home and/or bodily injury within one's home. Customers typically evaluate different homeowner's insurance options before purchasing a policy. This evaluation often results in a "quote" on the policy for the property. To receive an accurate quote, a customer must provide various information about the property and/or personal information. Quotes for different homeowner's insurance products require different information or answering different types of questions to arrive at an accurate price for the product. However, because of differences between various homeowners' insurance products, the quoting process may be different for each different insurance product. Thus, if a customer desires a quote for multiple or different homeowner insurance products, then the customer must complete the entire process for each product. The present embodiments may, inter alia, alleviate the foregoing and other complications.

SUMMARY

A system and method may provide an integrated purchase process for two or more different homeowner's insurance products online. The system and method may allow the customer to choose between two different forms of homeowners policies which may provide coverage. An online quote process may provide educational information and quoting capabilities which will allow the customer to make an informed decision when making a selection between a limited coverage policy and a full coverage policy. Customers may be able to select which policy best suits their needs and/or complete the purchase of either of the two or more homeowners polices online. The customer may also complete the quote and purchase process through a mobile computing device (e.g., a cellular phone, tablet, phablet, laptop, smart glasses, or other portable, mobile, or wearable electronics or computer). The systems and methods described herein may allow the customer to research, quote and purchase multiple coverage options online and through a mobile device, and/or to select the mix of coverage and price that best suits their personal needs.

In one aspect, a computer-implemented method of creating and presenting multiple insurance product offerings may be provided. The method may (1) receive, at a hardware server, a first data signal including customer demographic information and property information, wherein the first data signal may be received via a computer network and may originate from a client computing device. The method may (2) store the customer demographic information and property information in a data structure comprising a database that is communicatively coupled to the hardware server, and/or (3) determine two or more insurance product offerings based upon the stored customer demographic information and property information. Further, the method may (4) send, from the hardware server and via the computer network, a second data signal including data to enable the client computing device to display a graphic representation of the two or more insurance product offerings at the client computing device for customer review, approval, and/or modification. The method may also include (5) receiving, at the hardware sever via wired or wireless communication or data transmission, customer acceptance or modification of one of the insurance product offerings that is transmitted from the client customer device. The method may include additional, fewer, or alternate actions, including those described elsewhere herein.

In another aspect, a computer-implemented method of visually presenting multiple home owners insurance quotes simultaneously on a user interface may be provided. The method may include (1) causing, via one or more remote processors (such as remote processors or servers associated with an insurance provider), a display screen capable of collecting home information associated with a home from a user to be presented on a user interface of a client computing device (e.g., mobile device); (2) receiving, at or by the one or more remote processors, a request for a homeowners insurance quote from the user for a homeowners insurance policy covering the home via wired or wireless communication, or data transmission, from the client computing device; (3) in response to the user requesting the homeowners insurance quote via the user interface, generating, at or by the one or more remote processors, (a) a first summary associated with a first quote for a first homeowners insurance product covering the home, and (b) a second summary associated with a second quote for a second homeowners insurance product covering the home; and/or (4) causing, by the one or more remote processors, (a) the first summary associated with the first quote for the first homeowners insurance product covering the home, and (b) the second summary associated with the second quote for the second homeowners insurance product covering the home to be presented on the user interface of the client computing device to facilitate side-by-side comparison, review, or approval of the first and second homeowners insurance products covering the home by the user. The method may include additional, fewer, or alternate actions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 4 depicts an exemplary user interface for capturing data associated with quoting and purchasing homeowners insurance;

FIGS. 5A, 5B, 5C, and 5D depict an exemplary user interface for displaying homeowners insurance products offerings based upon the captured data and other data.

DETAILED DESCRIPTION

Figure 1:
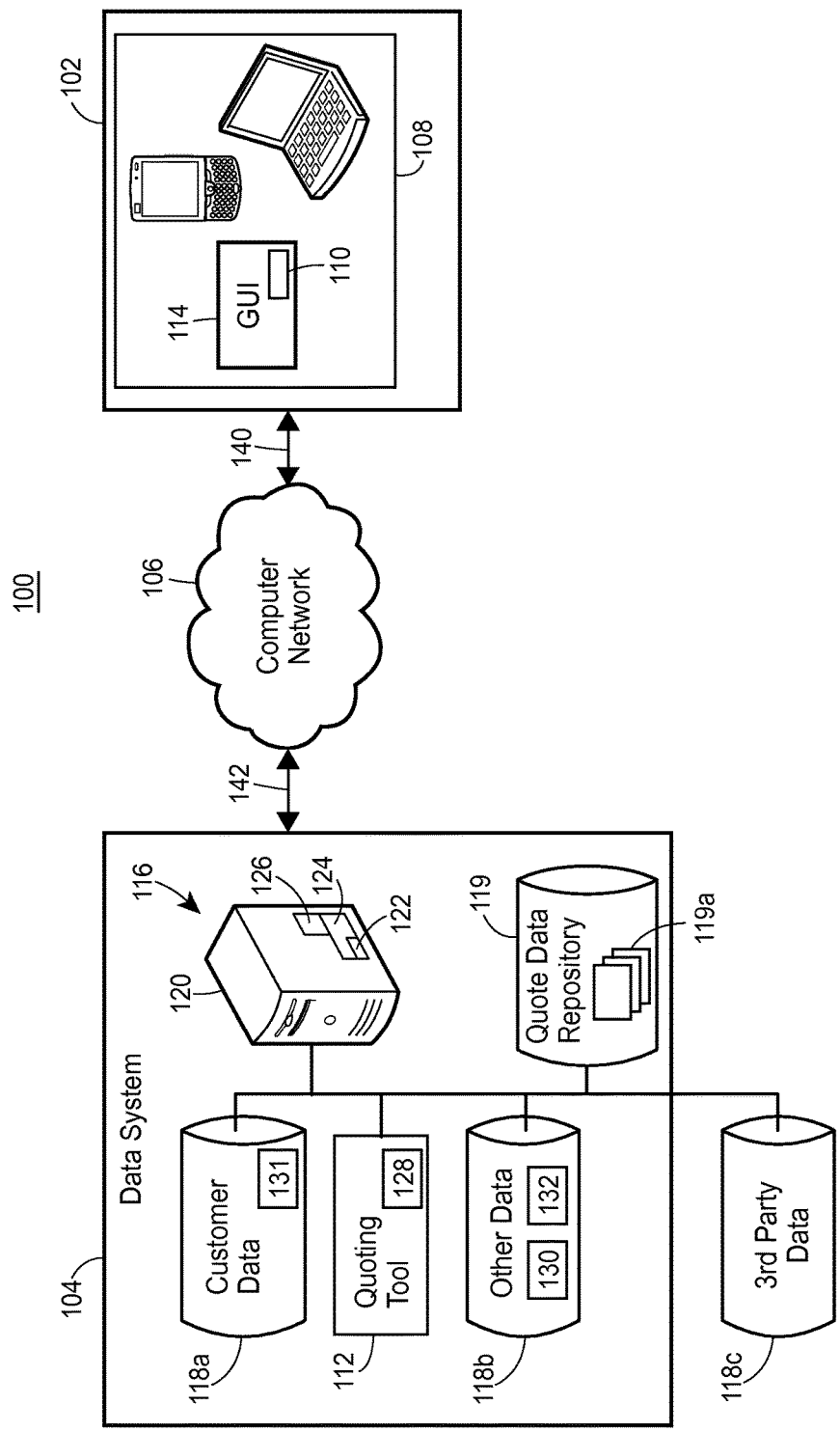
FIG. 1 depicts an exemplary environment including components and entities associated with quoting and purchasing homeowners insurance.

The present embodiments relate to, inter alia, a computer-implemented method of visually presenting multiple home owners insurance quotes simultaneously on a user interface. The method may include presenting a display screen capable of collecting home information from a user over the user interface; and in response to a user requesting a quote for homeowners insurance via a user interface (or a mobile device), and/or in response to a user answering one set of insurance-related questions requesting a quote for homeowners insurance via the user interface (or a mobile device), then simultaneously presenting (1) a first summary associated with a first quote for a first homeowners insurance product, and (2) a second summary associated with a second quote for a second homeowners insurance product to facilitate side-by-side comparison of the first and second homeowners insurance products. The first and second summaries may include monthly pricing amount information and/or discount amount information associated with the first and second homeowners insurance products, respectively. The user interface may present a side-by-side comparison of the coverages and/or other features or characteristics of the first and second homeowners insurance products, respectively, for review by the customer or potential customer.

In one embodiment, the user interface may visually or graphically indicate the progress of applying for an online homeowners insurance quote. The user interface may also graphically display means for customizing the two insurance products.

In one aspect, a computer-implemented method of providing insurance may be provided. The method may include providing user-specific and user-customizable life insurance quotes by remotely gathering, from a user via a user interface: (a) personal information; (b) home or dwelling information; (c) estimated replacement cost information; and/or (4) other types of information from a user. The information may be gathered from the user via wireless communication and/or a mobile device, such as a smart phone, cell phone, tablet, phablet, laptop, notebook, PDA (personal digital assistant), pager, smart watch, smart glasses, hand-held computing device, computer, access point, node, relay, other device capable of wireless RF (radio frequency) communication. The status of the process or workflow of the user entering various information to complete the purchase of home insurance may be visually or graphically represented by status bar or other icons. For example, the status bar may be made up of several icons that may change color to indicate if a step has been completed by the user.

In one embodiment, after the user enters answers to one set of questions, such as inquiries regarding home features, a quote for multiple home owner insurance products may be remotely calculated. The multiple quotes may be wirelessly communicated to the user's mobile device and displayed to the user. For instance, a standard homeowners insurance product quote may be displayed for comparison with a basic homeowners insurance product quote. The two quotes may identify the different products, their respective prices, their respective discounts, their respective coverages, and/or display or explain the differences between quotes with respect to certain criteria or characteristics, such as loss settlement, dwelling coverage, detached structures, deductibles, personal liability, personal property, medical payments, and/or other characteristics.

The present embodiments may include insurance coverage approaches that help manage claims and expenses, offer a relevant lower cost choice to consumers, and/or retain essential coverage based upon consumer preferences. Also, offering consumers online options to quote and then purchase insurance products via wired or wireless communication, such as with mobile devices, may offer efficiencies and conveniences to the consumers.

The present embodiments may accept limited information from a consumer, such as home location and/or features. Based upon the limited information, multiple quotes for insurance may be provided and simultaneously displayed or presented to the consumer, such as on a mobile device (e.g., smart phone). The consumer may then be able explore what discounts, charges, and options are available for consumers that select each product. The consumer may be provided with the ability to compare coverages and pricing information between two insurance products on a single display screen—such as after a single request for a single quote of a single type of insurance products, such as one request for a generic quote for homeowners insurance covering a home or other property.

I. Exemplary Homeowners Insurance Embodiments

The present aspects may relate to providing customers and sales associates the ability to quote and purchase multiple homeowners insurance products, including full coverage and limited coverage policies, online and through a mobile computing device. Generally, the aspects may provide an integrated purchase process for two different homeowner's insurance products online. The process may allow the customer to choose between two different homeowners policy forms which provide homeowners insurance coverage. The online process may provide educational information and quoting capabilities which may also allow the customer to make an informed decision when making a selection between a limited coverage policy and a full coverage policy. Customers may be able to select which policy best suits their needs and complete the purchase of either of the two homeowners polices online. Customers may also have the ability to complete this process through a mobile device. Offering the capability to research, quote and purchase multiple coverage options online and through a mobile device may allow customers the ability to select the mix of coverage and/or price that best suits their personal needs.

During use, an application such as dedicated software or a web browser application executing on a computing device (e.g., a mobile device, such as a smart phone, cell phone, tablet, phablet, laptop, notebook, PDA (personal digital assistant), pager, smart watch, hand-held computing device, wearable electronic device, computer, access point, node, relay, other device capable of computer network communication, wireless RF (radio frequency) communication, etc.), may guide a customer through a multiple insurance policy evaluation and purchasing process. The application may remotely and/or locally access any data necessary to complete any of the various functions described herein.

As an example, a user, such as an insurance customer or insurance sales associate, may desire information about various types of policies for a type of insurance (e.g., auto, home, life, etc.). Through a website, application, or other program executing on a computing device, the user may research different types of insurance coverage for their home. Using a computing device, the user may provide data to the system described herein, and/or the system may provide an integrated purchase process for two or more different insurance products in an online or other type of computing environment. In some aspects, a user or an automated data system may provide data such as particular information about the property to be insured, personal profile information, or other types of data. A backend data system (i.e., "server-side") may execute any functions as described herein, and/or provide information to the user within a user interface that is displayed to the user by a computing device. In other aspects, a frontend data system (i.e., "client-side") may execute any functions as described herein, and/or provide information to the user. The system may then analyze and process the data provided to the system. The system may then provide educational information and quoting capabilities, which may allow the user to make an informed decision when selecting between two or more insurance policies for the same property (e.g., between a "limited coverage policy" and a "full coverage policy"). A user may then select the policy which best suits their needs and/or complete a purchase of one of the two policies within the online or other computing device environment.

II. Exemplary Multiple Policy Quoting and Purchasing

The novel systems and methods disclosed herein relate generally to using a specialized computing device, computing environment, and methods to determine two or more quotes for insurance products that are related to the same item, property, or risk to be insured, and present the quotes to a user of the specialized computing device or environment. According to certain aspects, when the user is presented with the two or more quotes, the user may then purchase one of the policies in an online or mobile computing environment.

The systems and methods therefore may offer a benefit to users by allowing the user to choose between two different policies, which may provide insurance coverage. The online process may also provide educational information and/or quoting capabilities which will allow the customer to make an informed decision when making a selection between a limited coverage policy and a full coverage policy. Users may also be able to select which policy best suits their needs and/or complete the online purchase of one of the multiple policy quotes that are displayed in the computing environment. Customers may also have the ability to complete one or more of the education, quote, and/or purchase processes through a mobile device.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

III. Exemplary Environment for Multiple Policy Quoting and Purchasing

FIG. 1 depicts an exemplary environment 100 associated with providing customers and sales associates the ability to quote and purchase one of multiple insurance products for the same item, property, risk, etc., including full coverage and limited coverage policy forms, online and/or through a mobile device. Although FIG. 1 depicts certain entities, components, and devices, it should be appreciated that additional, fewer, or alternate entities and components are envisioned.

FIG. 1 generally illustrates one embodiment for a system 100 to create and present multiple insurance policy quotes to a customer, the quotes including a plurality of policies, lines, coverage, and other items. The system 100 may include front end components 102 and/or backend components 104 in communication with each other via a communication link 106 (e.g., computer network, internet connection, etc.). FIG. 1 illustrates a block diagram of a high-level architecture of a multiple insurance policies quote creation, presentation, and purchase system 100 including various software or computer-executable instructions and hardware components or modules that may employ the software and instructions to create and present multiple insurance policy quotes. The various modules may be implemented as computer-readable storage memories containing computer-readable instructions (i.e., software) for execution by a processor of the computer system 100 within a specialized computing device. The modules may perform the various tasks associated with creating, presenting, and/or purchasing insurance policies, as herein described. The computer system 100 may also include both hardware and software applications, as well as various data communications channels for communicating data between the various hardware and software components.

The multiple insurance policies quote creation, presentation, and/or purchase system 100 may include various entities at the front end 102 that may communicate survey data to the backend components 104 to complete quote and policy creation and/or presentation. For example, the front end components 102 may include a computing device 108 that may be capable of executing a graphical user interface (GUI) 110 for a quoting tool 112 within a web browser 114 or other application executing on a computing device. In some embodiments, a computing device 108 may execute instructions of a network-based data system 116 to receive customer data 118a, other data 118b, and/or historical data 118c at the front end components 102 via the computer network 106 for display in the GUI 110. The backend components 104 may receive the data 118a, 118b, 118c from the front end components 102 via the computer network 106 from execution of a quoting tool 112. The quoting tool 112 may include instructions that, when executed by one or more processors of the system 100, create policy quotes for multiple different forms of insurance 119a and/or cause the quotes 119a to be stored in a quote data repository 119.

Generally, each quote 119a may be a data structure comprised of a plurality of data to be presented to the user.

The computing device 108 may include a personal computer, smart phone, tablet computer, or other suitable computing or mobile device. The GUI 110 may communicate with the system 116 through the Internet 106 and/or other type of suitable network (local area network (LAN), a metropolitan area network (MAN), a wide area network (WAN), a mobile, a wired or wireless network, a private network, a virtual private network, etc.). The network 106 may facilitate any type of data communication via any standard or technology (e.g., GSM, CDMA, TDMA, WCDMA, LTE, EDGE, OFDM, GPRS, EV-DO, UWB, Wi-Fi, IEEE 802 including Ethernet, WiMAX, and/or others). In general, an insurance provider may be an entity capable of assessing risks of various liability-generating incidents occurring. A system server 120 may send and receive information and data 118a, 118b, 118c for the system 100 such as computer-executable instructions and/or data associated with applications executing on the computing device 108 (e.g., the bundle tool 112). The applications executing within the system 100 may include cloud-based applications, web-based interfaces to the data system 116, software applications executing on the computing device 108, and/or applications including instructions that may be executed and/or stored within any component of the system 100. The applications, GUI 110, browser 114, and/or tool 112 may be stored in various locations including separate repositories and/or physical locations.

In some embodiments, the data system 116 in general and the server 120 in particular may include computer-executable instructions 122 stored within a memory 124 of the server 120 and/or executed using a processor 126 to create a specialized computing device. The instructions 122 may instantiate a quoting tool 112 and/or send instructions to the computing device 108 to instantiate a GUI 110 for the tool 112 using a web browser application 114 of a computing device 108. In some embodiments, the browser application 114, GUI 110, quoting tool 112, and/or elements of the data system 116 may be implemented at least partially on the server 120 and/or the computing device 108. The data system 116 and/or processor 126 may execute instructions 122 to display the GUI 110 including the data 118a, 118b, 118c within a display of the computing device 108. The GUI 110 may allow a user to access various data 118a, 118b, 118c within the data system 116, edit and/or add data to the system 100, and/or other actions with the system data.

The quoting tool 112 may include household data 128 gained through a detailed, online customer survey. The system 100 may receive the household data 128 through an on-line environment (e.g., the computing device 108) and/or web-based user interface, as further described herein. The system 100 may also receive additional household data 128 from customer data 118a, other data 118b, and/or third party data 118c when appropriate.

The quoting tool 112 may include various instructions for execution by a processor 126 to create and/or display quotes for different forms of insurance (e.g., full or limited coverage, varying limits, etc.). For example, the quoting tool 112 may create quotes by using the user demographic, property data, and/or other data from a completed survey 128 to capture various information including an effective date, customer information, additional quote information, and/or household information. This captured household data 128 may then be analyzed by the quoting tool 112 to determine various products and/or policies which may be offered to the customer. The quoting tool 112 may then capture a customer selection for one of the products or policies and/or then calculate a quote for the selection. The tool 112 may then present the quote to the user. The tool 112 may also allow the customer to modify the coverage and/or modify the product selection before facilitating purchase of the policy.

Figure 2:
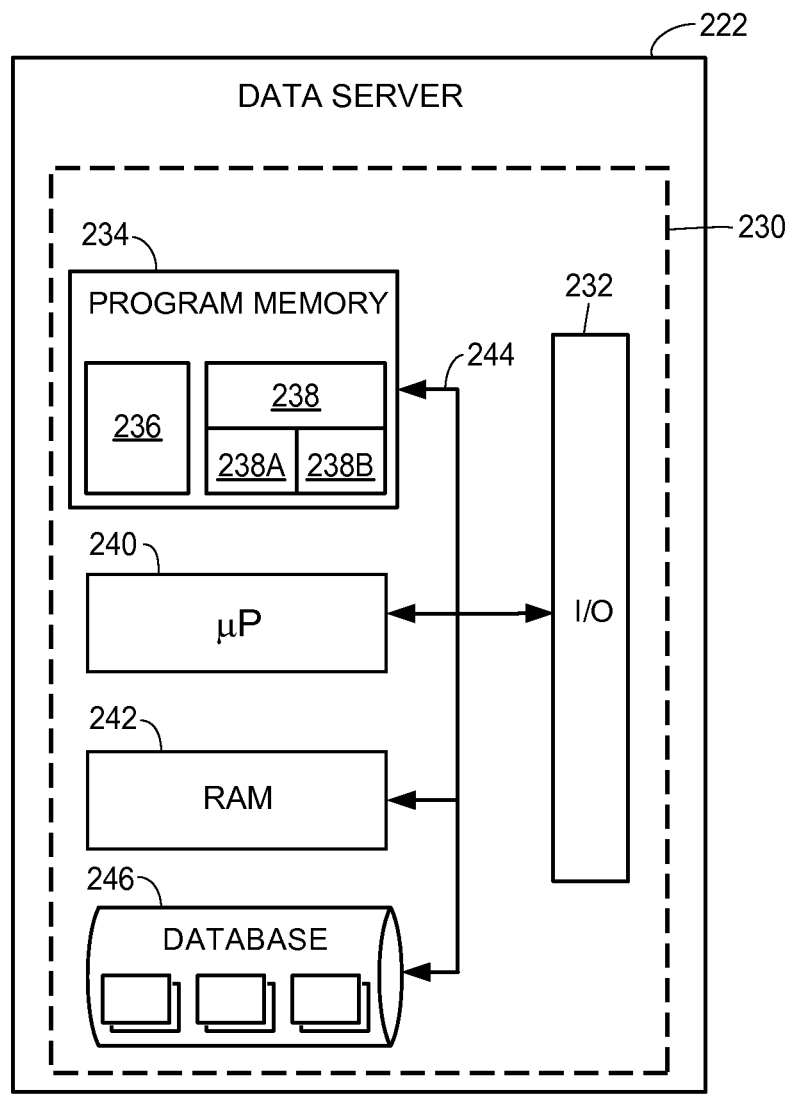
FIG. 2 is an exemplary architecture of a server of a system for multiple insurance policy quoting and purchasing.

Referring now to FIG. 2, a data server 120 may include a controller 230. The controller 230 may include a program memory 234, a microcontroller or a microprocessor (P) 240, a random-access memory (RAM) 242, and/or an input/output (I/O) circuit 232, all of which may be interconnected via an address/data bus 244. The program memory 234 may store computer-executable instructions, which may be executed by the microprocessor 240. In some embodiments, the controller 230 may also include, and/or otherwise be communicatively connected to, a database 246 or other data storage mechanism (one or more hard disk drives, optical storage drives, solid state storage devices, etc.). The database 246 may include data such as customer surveys, data for multiple different insurance policy forms, etc. It should be appreciated that although FIG. 1 depicts only one microprocessor 240, the controller 230 may include multiple microprocessors 240. Similarly, the memory 234 of the controller 230 may include multiple RAMs 236 and multiple program memories 238, 238A and/or 238B storing one or more corresponding server application modules, according to the controller's particular configuration.

Although FIG. 2 depicts the I/O circuit 232 as a single block, the I/O circuit 232 may include a number of different types of I/O circuits (not depicted), including but not limited to, additional load balancing equipment, firewalls, etc. The RAM(s) 236, 242 and the program memories 238, 238A and/or 238B may be implemented in a known form of computer storage media, including but not limited to, semiconductor memories, magnetically readable memories, and/or optically readable memories, for example, but does not include transitory media such as carrier waves.

IV. Exemplary Method and User Interfaces for Multiple Policy Quoting and Purchasing With reference to FIG. 3, the computer system 100 described herein may be specialized to employ a method 300 (FIG. 3) to receive data corresponding to a customer to be used in creating and/or presenting two or more insurance quote 119a recommendations to the customer. The method 300 may include one or more functions or routines in the form of non-transitory computer-executable instructions that are stored in a tangible computer-readable storage medium and/or executed using a processor of a computing device (e.g., the computing device 102, the server 120, and/or any combination of computing devices within the system 100). The routines may be included as part of any of the modules described in relation to FIG. 1, above, or FIG. 6, below, or as part of a module that is external to the system illustrated by FIGS. 1 and 6. For example, the method 300 may be part of a browser application or another application running on the computing device 102 as a plug-in or other module of the browser application. Further, the method 300 may be employed as "software-as-a-service" to provide a computing device 102 with access to the data system. In some aspects, the method 300 may execute various instructions in response to selection of one or more graphic elements that are illustrated or displayed with the GUI 110, as further described below.

At function 301, the system 100 may execute an instruction to initiate a multiple quote process. For example, the backend data system 104 may receive a function call from a frontend client computing device 102 via the network 106 to execute one or more instructions to launch a quoting tool 112. The instruction to initiate a multiple quote process may cause the backend system 104 to access GUI data or other data 128 for the quoting tool 112. The data 128 may then be used by the frontend 102 or backend 104 during execution of an instruction to render a webpage or other graphical user interface (GUI) 400 (FIG. 4) on the frontend 102.

With reference to FIG. 4, data 128 received from the backend 104 via the network 106 may be used by the frontend 102 to render the GUI 400. The GUI 400 may include a plurality of selectable graphic elements 402, 404, 406, 408, that, when selected by a user, each may initiate a call to one or more functions or instructions of the quoting tool 112. Function calls from the selectable graphic elements may include data retrieved from one or more text fields 410 of the GUI 400 upon selection of a selectable graphic element 402 and/or sent from the client computing device 102 to the data system 104 via the network 106 as a first data signal 140 and/or then stored within one or more data repositories (e.g., 118*a*, 118*b*) and then may used in determining multiple insurance product offering quotes as described herein.

At function 302, the system 100 may execute an instruction to capture an effective date (FIG. 1, 130) for an insurance policy. In some aspects, the system 100 may execute an instruction of the quoting tool 112 upon launching the GUI 400 to retrieve a system date or time of the client computing device 108. In other aspects, the data system 104 may include one or more servers that include a system time that may then be used as the effective date 130. Capturing the effective date data 130 may also include executing an instruction to send the effective date data 130 from the client computing device 102 to the data system 104 via the network 106 as a first data signal 140 and/or store the data 130 within one or more databases (e.g., 118*b*) of the data system 104.

At function 304, the system 100 may execute an instruction to capture customer information 131 (FIG. 1) for multiple quotes for an insurance policy. In some aspects, the system 100 may execute an instruction of the quoting tool 112 upon receiving a function call at the backend 104. For example, the GUI 400 may include a plurality of text fields 410 that may allow a user viewing the GUI 400 at a client computing device 108 to enter various personal and/or demographic information. In some aspects, the text fields corresponding to function 304 may allow entry for a name, age, hometown, occupation, gender, and/or other personally identifying, demographic information. Capturing the customer information 131 may also include executing an instruction to store the data 131 within one or more local or remote databases (e.g., 118*a*) of the data system 104. In some aspects, a function call associated with a selectable graphic element 402 may cause the data 131 to be sent from the client computing device 102 to the data system 104 via the network 106 as a first data signal 140, and/or then stored within one or more data repositories (e.g., 118*a*, 118*b*).

At function 306, the system 100 may execute an instruction to capture additional quote information 132 (FIG. 1) for multiple quotes for an insurance policy. In some aspects, the system 100 may execute an instruction of the quoting tool 112 upon receiving a function call at the backend 104. For example, the GUI 400 may include a plurality of text fields 420 that may allow a user viewing the GUI 400 at a client computing device 108 to enter various additional quote information. In some aspects, the text fields corresponding to function 306 may allow entry for a time period for a policy, information about other insurance policies on other properties owned by the customer, a length of time the customer has owned the other properties, an estimated replacement cost for the property or portions of the property to be insured under the multiple different insurance product offerings, and/or other information that might be used during a quoting process. Capturing the additional quote information 132 may also include executing an instruction to store the data 132 within one or more local or remote databases (e.g., 118*a*) of the data system 104. In some aspects, a function call associated with a selectable graphic element 404 may cause the data 132 to be sent from the client computing device 102 to the data system 104 via the network 106 as a first data signal 140, and/or then stored within one or more data repositories (e.g., 118*a*, 118*b*).

At function 308, the system 100 may execute an instruction to capture household information 128 (FIG. 1) for multiple quotes for an insurance policy for the house or other property. In some aspects, the system 100 may execute an instruction of the quoting tool 112 upon receiving a function call at the backend 104. For example, the GUI 400 may include a plurality of text fields 430 that may allow a user viewing the GUI 400 at a client computing device 108 to enter various information about the property for which they desire a quote. The information 128 may include a year the home was built, a size, a type of roof, a siding material type, an address or other location information, and/or any other type of information about or related to the property for which the customer wishes to receive a quote. Capturing the household information 128 may also include executing an instruction to store the data 128 within one or more local or remote databases (e.g., 118*a*) of the data system 104. In some aspects, a function call associated with a selectable graphic element 406 may cause the data 128 to be sent from the client computing device 102 to the data system 104 via the network 106 as a first data signal 140 and/or then stored within one or more data repositories (e.g., 118*a*, 118*b*).

Once the data system 104 receives the various data described above from the client computing device (i.e., the effective date 130, the customer information 131, the additional quote information 132, the household information 128, etc.), the system 100 may execute an instruction to create and/or display two or more insurance product offerings at function 310. In some aspects, the instruction to create and/or display two or more insurance product offerings 310 may include an instruction to analyze the data received from the client computing device (i.e., 128, 130, 131, 132, etc.) to determine which types of insurance products or offerings are applicable to that received information. For example, where the received effective date 130, customer information 131, additional quote information 132, household information 128, etc., corresponds to an automobile, then the system 100 may display multiple different types of automobile insurance product offerings that correspond or are applicable to that received information. Likewise, where the data received by the data system 104 corresponds to a home or other type or property, then the system 100 may cause the client computing device 108 to display multiple different types of home or property insurance product offerings.

At function 312, the system 100 may execute an instruction to capture customer product selections from the products displayed at function 310. In some aspects, the displayed products may include a selectable graphic object that is associated with a function call and/or other instruction that is executable by a processor of the system 100.

Once the data system 104 receives the various data described above from the client computing device (i.e., the effective date 130, the customer information 131, the additional quote information 132, the household information 128, etc.) at functions 302, 304, 306, 308, as well as the customer selection at function 312, the system 100 may execute an instruction to calculate a quote for each product selection at function 314. For example, the system may analyze the received data (128, 130, 131, 132) to determine a monthly and/or yearly premium, an annual discount, and/or other information to be included within each of the multiple insurance product offerings based upon different coverage, services, and/or other aspects of each of the offerings. In some aspects, the system 100 may also analyze third party data 118c to determine any portion of information, coverage, services, etc., included within the product offerings. For example, the system 100 may access actuarial data, information about other insurance policies that include the customer or the particular property to be insured, and/or any other data that may be related directly or indirectly to determining a policy premium for a property under multiple different insurance product offerings.

At function 316, the system may execute an instruction to display the quote calculated at function 314 as well as further information for the multiple insurance product offerings selected by the customer at function 312 within a user interface 500 (FIG. 5) presented at the client computing device 108. In some aspects, function 316 may include sending, from the data system 104 and/or via the computer network, a second data signal including data to enable the client computing device 108 to display a graphic representation of the multiple insurance product offerings (i.e., two or more insurance product offerings) at the client computing device. For example, the data of the second data signal may include one or more of vector graphics data, markup language data (e.g., HTML, XHTML, SGML, etc.), graphics, images, and/or any other type of data describing the GUI 500 (FIG. 5) and its displayable information. Further, the instruction to display the quote 316 may include an instruction to determine one or more differences between a first offering 500a and a second offering 500b and, when a difference is determined, the second data signal may include further data to enable the client computing device 108 to display a difference indicator 508 between, and/or proximate to, coverage information 506 that is different between the first and second offerings.

With reference to FIG. 5, function 316 may also include causing the data system 104 to send data to the client computing device 108 via the network 106 which causes or enables the device 108 to display a multiple insurance product offerings user interface 500 at the client computing device 108. While the interface 500 illustrates two different insurance product offerings, the interface 500 may include any number of offerings as selected by the customer at function 312. The interface 500 may include various information for, or related to, the multiple different insurance product offerings. In some aspects, the interface may include a general description of the multiple different offerings 502 (i.e., a first description 502a for a first offering 500a and a second description 502b for a second offering 500b), a policy premium amount 504 for each offering (i.e., a first premium 504a corresponding to the first offering 500a and a second premium 504b corresponding to the second offering 500b), coverage information 506, difference indicators 508, and/or one or more selectable graphic elements 510.

Coverage information 506 may include various coverage categories for each type of coverage included within an offering.

The coverage categories for the displayed first and second offerings 500a, 500b may also include a shared set of coverage categories and sub-categories, as illustrated in FIG. 5 and/or as further explained below. For example, the coverage categories for both the first and second insurance product offerings 500a, 500b may include protection for your home 512, deductibles 514, other home coverages 516, protection for you 518, protection for your personal property 520, increasing your coverage limits 522, other personal property coverages 524, additional coverage options 526, and/or a second copy of the policy premium amount 528.

Protection for your home 512 may also include various sub-categories of coverage. The subcategories under protection for your home 512 may include dwelling coverage 512a for protecting the physical structure of a home, detached structures 512b for other buildings on residence premises, and/or option ID 512c for extra coverage when the home is insured to at least 100% of its estimated replacement cost. In some aspects, the option ID 512c coverage may provide additional coverage over and above the coverage limit if the cost of repairing or replacing the home exceeds the dwelling amount.

Other subcategories may include loss settlement 512c for guaranteeing how a claim may be settled in the event of a covered loss, roof surface loss settlement 512e for how a claim for the roof surface would be covered in the event of a covered loss, loss of use 512f for alternate living expenses in the case of a covered loss where you may no longer live in your home while it is being repaired, and/or loss of use rental value 512g for lost rental income from a tenant in the case of a covered loss where your tenant can no longer live in your home while its being repaired.

Deductibles 514 may describe a portion of a covered loss that must be paid by the policy holder in the event of a covered loss. Generally, the higher the deductible, the less a policy holder pays for the premium 504a, 504b. However, if the policy holder incurs a covered loss, more of the loss will be the holder's responsibility.

Other home coverages 516 may include various subcategories, as well. In some aspects, the coverage may include trees/shrubs 516a for any such plantings on a holder's property, power interruption 516b for losses caused by power interruption resulting in another loss based upon temperature changes in the dwelling, collapse 516c for the insured structure in case of collapse due to hidden insect of vermin damage or hidden decay, and/or lock rekeying 516d that, in some aspects, may be due to the theft of a key.

Protection for you 518 may include various subcategories, such as personal liability 518a for personal legal responsibility up to policy limits for bodily injury or property damages caused by a covered event, and/or legal defense of such claims. Other subcategories of coverage may include medical payments 518b for medical expenses up to policy limits for injuries to people on a holder's premises with the holder's permission.

Protection for your personal property 520 may include one or more subcategories, too. For example, personal property 520a may describe coverage for losses to property within the covered home and/or a loss settlement option for personal property 520b describing how a holder's claims would be settled in the event of a covered loss.

As with the other categories described above, the increasing your coverage limits 522 category may include one or more sub-categories, as well. These subcategories may describe what type of articles may be particularly covered or have increased coverage under a policy offering. In some aspects, the articles may include home computers 522a, jewelry and furs 522b, and silverware and gold ware 522c. Other sub-categories may include business property 522d for personal property used in a business, building ordinance of law 522e for coverage against the demolition of the undamaged portion of a building due to a building or zoning law, and firearms 522f.

Other personal property coverages 524 may include sub-categories, such as damage to refrigerated products 524a for perishable items due to unintentional power loss or equipment breakdown to a refrigerator or freezer, sudden or accidental damage from electrical current 524b for electrical devices that may be damaged from a sudden and accidental power fluctuation, tools 524c for theft of tools, and/or multiple-wheeled (e.g., 2, 3, 4, etc.) vehicles 524d for non-automobile vehicles such as all-terrain vehicles, mini-bikes, golf carts, chariots, etc., that are not required to carry automobile insurance by law.

Additional coverage options 526 may include the subcategories of backed-up sewer drains 526a for losses due to water that backs up through sewers or drains, including sump pumps, or any system designed to remove sub-surface water. Vacancy 526b may insure against vandalism or glass breakage when the property insured by the offering is vacant for more than 30 days. A second copy of the policy premium amount 528 may also be displayed within the user interface 500.

Figure 3:
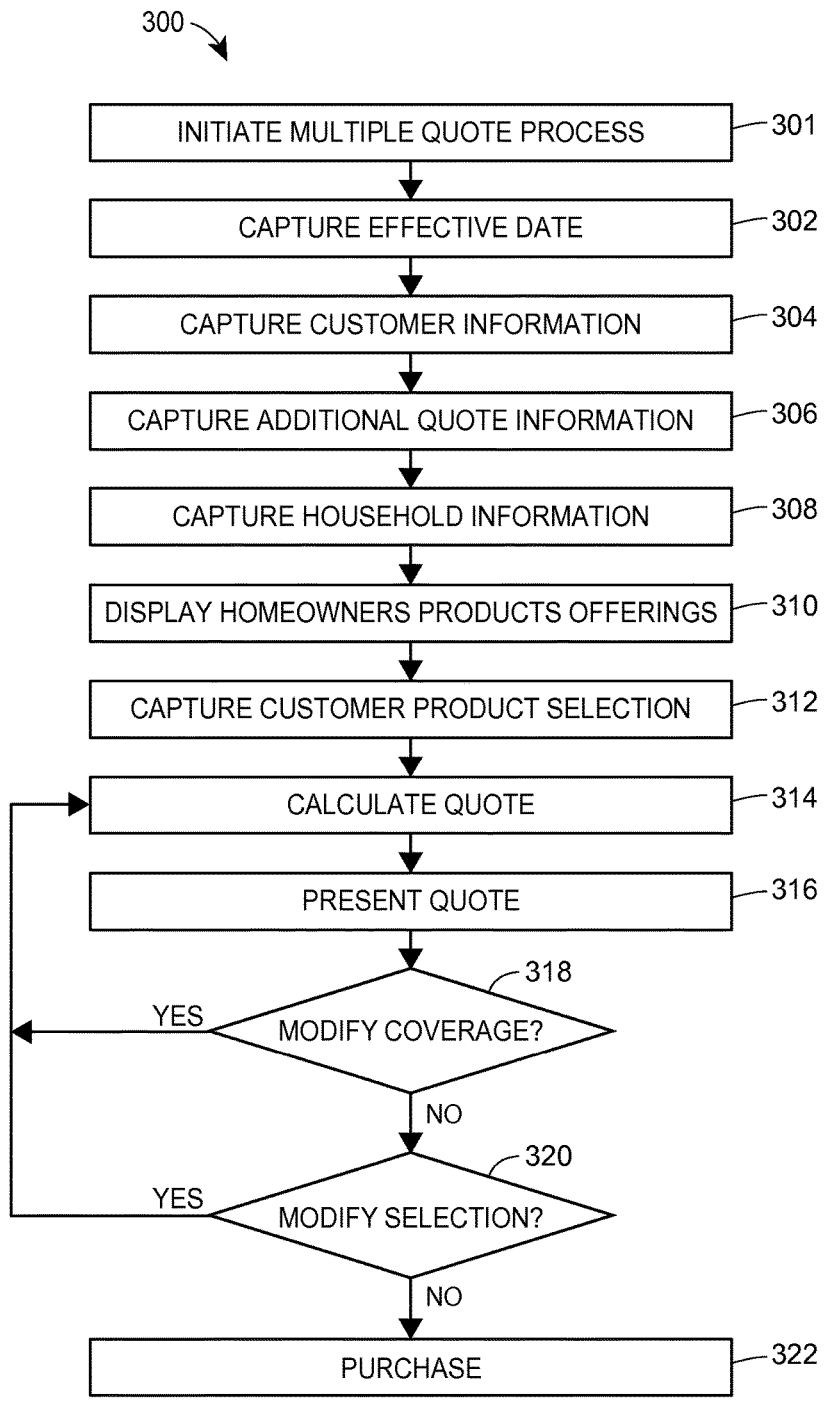
FIG. 3 depicts an exemplary flow diagram associated with an insurance provider for selecting multiple forms of homeowners insurance during a quote and purchase process.

Returning to the method 300 of FIG. 3, the system 100 may execute an instruction to modify some or all of the data used to calculate and present the quote presented at function 318. For example, a user may select one of the selectable graphic elements 510 from the interface 500 which initiates a function call to send a message to the data system 104 via the network 106. Each of the selectable graphic elements 510 may be associated with a function call to execute an instruction that may allow a user to change or customize various data (i.e., data 130, 131, 132, etc.) that was used to create the first and second offerings 500a, 500b. In some aspects, the function call associated with a selectable graphic element 510 may cause another graphic user interface to be displayed at the client computing device 108 upon selection by a user. The other user interface may then allow the user to select a first or second offering 500a, 500b for purchase or change information, limits, and/or other data associated with the coverage information. In other aspects, the function call associated with a selectable graphic element 510 may cause some or the entire user interface 400 to be displayed at the client computing device 108 for re-entry of some or all of the data 128, 130, 131, 132 to be replaced or modified by the customer. If the data system 104 receives an indication of the customer modifying coverage from the client device 108 via the network 106, then the method may return to function 314 and re-calculate the quote and proceed to function 316 to present the re-calculated quote(s) within the user interface 500 including first and second product offerings 500a, 500b. If the data system 104 does not receive an indication of the customer modifying coverage from the client device 108 via the network 106, then the method may proceed to function 320.

At function 320, the system 100 may execute an instruction to modify offering selections. In some aspects, the system 100 may present a user interface including one or more selectable graphic objects. One or more of the selectable graphic objects may correspond to a function call that modifies the selection received by the selection captured at function 312. If the data system 104 receives an indication of the customer modifying the selection received at function 312, then the method may return to function 314, re-calculate the quote, and/or proceed to function 316 to present the re-calculated quote(s) within the user interface 500 including first and second product offerings 500a, 500b. If the data system 104 does not receive an indication of the customer modifying the selection that was received at function 312, then the method may proceed to function 322.

At function 322, the system 100 may execute an instruction to complete a purchase transaction for one of the first and second offerings 500a, 500b. In some aspects, the system 100 may receive an indication of a customer selection of one of the first and second offerings 500a, 500b from a function call associated with one or more of the selectable graphic objects 510 within the user interface 500. The purchase transaction may include one or more other instructions to receive and/or process payment or other information in order to bind the quote of either the first or second offering 500a, 500b, as selected by the customer. In some aspects, function 322 may include receiving, at the data system 104 and/or via the computer network, a third data signal including data to enable the data system 104 to bind the quote. For example, the data to enable binding the quote may include payment information, an indication of offering selection (i.e., either the first or the second insurance product offering 500a, 500b), etc. The instruction to bind the quote may also include an instruction to associate the data stored at the data system 104 with the data to enable the hardware server to execute one or more instructions to bind the customer to one of the two or more insurance product offerings. For example, all of the stored household information 128, the stored effective date 130, the stored customer demographic information 131, and/or the additional quote information 132 may be transformed to be associated or logically linked to the payment information and the data indicating a customer selection of one of the two or more insurance product offerings. After completing function 322, the method may end. The method may include additional, fewer, or alternate actions, including those discussed elsewhere herein.

V. Exemplary Server

Figure 6:
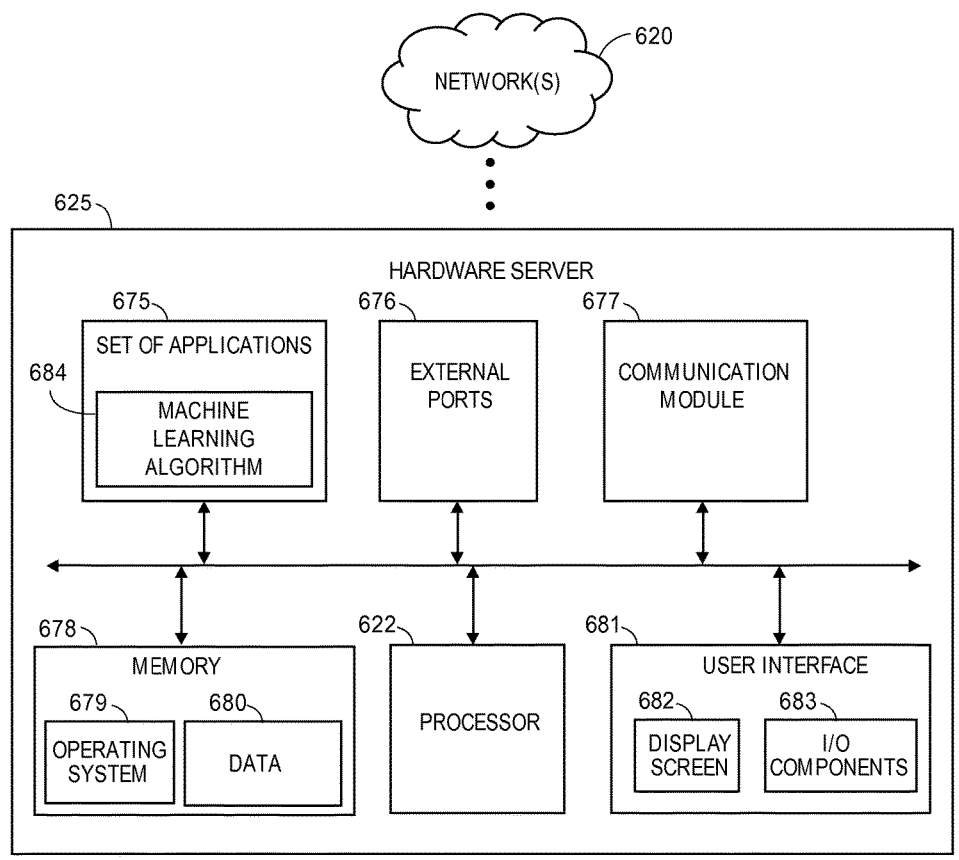
FIG. 6 is a block diagram of an exemplary computing environment that implements a system and method for selecting multiple forms of homeowners insurance during a quote and purchase process.

FIG. 6 illustrates a diagram of an exemplary hardware server 625 (such as the hardware server 120 as discussed with respect to FIG. 1) in which the functionalities as discussed herein may be implemented. It should be appreciated that the hardware server 625 may be associated with an insurance provider, as discussed herein.

The hardware server 625 may include a processor 622 as well as a memory 678. The memory 678 may store an operating system 679 capable of facilitating the functionalities as described herein. The hardware server 625 may also store a set of applications 675 (i.e., machine readable instructions). For example, one of the set of applications 675 may be a machine learning algorithm 684 configured to create and/or present multiple insurance product offerings for a customer and also facilitate binding the quote. It should be appreciated that other applications are envisioned.

The processor 622 may interface with the memory 678 to execute the operating system 679 and the set of applications 675. According to some embodiments, the memory 678 may also include data 680 that may include any or all of the data described in relation to the systems and methods described herein. The machine learning algorithm 684 may access the data 680 to determine two or more insurance product offerings for display to the customer, determine one or more differences between data related to a coverage category of the first offering and the same coverage category of the second offering, and/or display a difference indicator that indicates the determined difference. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The hardware server 625 may further include a communication module 677 configured to communicate data via one or more networks 620. According to some embodiments, the communication module 677 may include one or more transceivers (e.g., WWAN, WLAN, and/or WPAN transceivers) functioning in accordance with IEEE standards, 3GPP standards, or other standards, and/or configured to receive and/or transmit data via one or more external ports 676. For example, the communication module 677 may send or transmit, via the network 620, data to enable a client computing device (i.e., mobile computing device) to present two or more insurance product offerings to a customer based upon received demographic, property, and/or other data. The processing server 625 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, speakers, and/or microphones). According to the present embodiments, the user may access the hardware server 625 via the user interface 681 to send the demographic, property, and/or other data and/or perform other functions. In some embodiments, the hardware server 625 may perform the functionalities as discussed herein as part of a "cloud" network and/or may otherwise communicate with other hardware or software components within the cloud to send, retrieve, or otherwise analyze data.

The hardware server 625 may be a local or remote server. For instance, the hardware server 625 may be a remote server, such as a remote located server associated with the insurance provider. Other servers may be used.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 622 (e.g., working in connection with the operating system 679) to facilitate the functions as described herein. In this regard, the program code may be implemented in any desired language, and/or may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

VI. Exemplary Computer-Implemented Methods

In one aspect, a computer-implemented method of creating and/or presenting multiple insurance product offerings may be provided. The method may include (a) receiving, at a hardware server, a first data signal including customer demographic information and/or property information, wherein the first data signal is received via a computer network (or wired or wireless communication) and originates from a client computing device; (b) storing the customer demographic information and/or property information in a data structure comprising a database that is communicatively coupled to the hardware server; (c) determining two or more insurance product offerings based upon the stored customer demographic information and/or property information; and/or (d) sending (or transmitting), from the hardware server and/or via the computer network, a second data signal including data to enable the client computing device to display a graphic representation of the two or more insurance product offerings at the client computing device, such as for the client's or customer's review, approval, and/or modification of one of the two or more insurance products offerings. The method may also include (e) receiving, such as via wireless communication at the hardware server or computer network, from the client computing device an approval or modification of one of the insurance products offering, and/or (f) then generating or adjusting an insurance policy associated with the approved or modified insurance product at or via the hardware server or computer network. Additionally or alternatively, other information and/or characteristics associated with the property or the customer may be matched or compared to determine the two or more insurance product offerings. The method may include additional, fewer, or alternate actions, including those discussed elsewhere herein.

The methods discussed above and herein may further include taking insurance-related actions based upon the creating and/or presenting multiple insurance product offerings functionality detailed herein. The method may include adjusting insurance rates, premiums, discounts, points, and/or rewards. For instance, the remote server associated with an insurance provider that may receive demographic and/or property data may also bind the quote to a customer or determine differences in shared characteristics between the two displayed offerings and/or display an indication of those determined differences.

VII. Exemplary Mobile Devices

In one aspect, a mobile device configured to facilitate creating and presenting multiple insurance product offerings may be provided. The mobile device may include a memory storing information associated with customer demographics data and/or property data, and/or a processor configured to: (a) send or transmit, to a hardware server, a first data signal including customer demographic information and property information, wherein the first data signal is sent via a computer network; (b) receive, from the hardware server and/or via the computer network, a second data signal including data to enable the client computing device to display a graphic representation of two or more insurance product offerings at the client computing device that are based upon the customer demographic information, the property information, actuarial data, third party, and/or other data; and/or (c) send or transmit a selection of the one of the two or more insurance product offerings in order to bind the quote to the customer. The mobile device may include additional, fewer, or alternate functionality, including that discussed elsewhere herein.

VIII. Exemplary Remote Server Functionality

In another aspect, a remote server configured to create and present multiple insurance product offerings may be provided. The server may include (i) a database including customer demographic information, property information, and/or other data; (ii) a transceiver configured to receive a first data signal including the customer demographic information and/or property information, wherein the first data signal is received via a computer network and originates from a client computing device; and/or (iii) a processor configured to determine two or more insurance product offerings based upon the stored and/or received customer demographic information and/or property information. The transceiver may be further configured to send, from the hardware server and via the computer network, a second data signal including data to enable the client computing device to display a graphic representation of the two or more insurance product offerings at the client computing device.

The server may include additional, fewer, or alternate functionality, including that discussed elsewhere herein. For instance, a remote server located at an insurance provider location may calculate adjustments for insurance premiums, rates, discounts, points, or rewards based upon the customer demographic, property, actuarial, and/or other data, as discussed elsewhere herein.

IX. Exemplary Computer System

In another aspect, a system for creating and presenting multiple insurance product offerings may be provided comprising one or more processors, one or more communication modules adapted to communicate data, and/or a program memory coupled to the one or more processors and/or storing executable instructions that when executed by the one or more processors cause the computer system to perform various tasks. For example, the instructions may cause the computer system to receive, at a hardware server, a first data signal including customer demographic information and property information, wherein the first data signal is received via a computer network and originates from a client computing device and/or store the customer demographic information and/or property information in a data structure comprising a database that is communicatively coupled to the hardware server. Further, the instructions may cause the computer system to determine two or more insurance product offerings based upon the stored customer demographic information and/or property information, and/or send or transmit, from the hardware server and via the computer network, a second data signal including data to enable the client computing device to display a graphic representation of the two or more insurance product offerings at the client computing device. The system may include other components and functionality, including that discussed elsewhere herein.

X. Exemplary Computer-Readable Medium

In still another aspect, a tangible, non-transitory computer-readable medium may store instructions for creating and/or presenting multiple insurance product offerings. When executed by at least one processor of a computer system, the instructions may cause the computer system to receive, at a hardware server, a first data signal including customer demographic information and/or property information, wherein the first data signal is received via a computer network and originates from a client computing device and store the customer demographic information and/or property information in a data structure comprising a database that is communicatively coupled to the hardware server. Further, the instructions may cause the computer system to determine two or more insurance product offerings based upon the stored customer demographic information and/or property information, and/or send or transmit, from the hardware server and via the computer network, a second data signal including data to enable the client computing device to display a graphic representation of the two or more insurance product offerings at the client computing device. The tangible, non-transitory computer-readable medium may store additional, fewer, or alternate computer-executable instructions, including those discussed elsewhere herein.

XI. Exemplary Computer Apparatus

In a still further aspect, a computer apparatus for creating and/or presenting multiple insurance product offerings may be provided. The apparatus may comprise means to receive, at a hardware server, a first data signal including customer demographic information and/or property information, wherein the first data signal is received via a computer network and originates from a client computing device. Additionally, the apparatus may include means to store the customer demographic information and/or property information in a data structure comprising a database that is communicatively coupled to the hardware server and/or means to determine two or more insurance product offerings based upon the stored customer demographic information and property information. Further, the apparatus may include means to send or transmit, from the hardware server and via the computer network, a second data signal including data to enable the client computing device to display a graphic representation of the two or more insurance product offerings at the client computing device. The computer apparatus may include additional, fewer, or alternate components or functionality, including that discussed elsewhere herein.

XII. Additional Considerations

Although the various aspects are described herein are described in relation to homeowners insurance, the present embodiments may also relate to other types of insurance and property including auto, boat, personal articles, commercial lines, assumption reinsurance, aviation insurance, bond insurance, builder's risk insurance, business interruption insurance, casualty insurance, catastrophe bonds, chargeback insurance, credit insurance, death bonds, directors and officers liability insurance, earthquake insurance, expatriate insurance, fidelity bonds, financial reinsurance, flood insurance, GAP Insurance, general insurance, group insurance, guaranteed asset protection insurance, key person insurance, landlords' insurance, legal expenses insurance, lenders mortgage insurance, liability insurance, longevity bonds and insurance, marine insurance, pet insurance, political risk insurance, pollution insurance, prize indemnity insurance, professional liability insurance, reinsurance, satellite insurance, shipping insurance, terminal illness insurance, terrorism insurance, trade credit insurance, travel insurance, UCC insurance, uninsured employer insurance, wage insurance, war risk insurance, and weather insurance, or any other type of insurance product that is capable of being assessed by a user as multiple products.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the computing device 108, the server 120, any combination of computing devices within the system 100, or the computing environment of FIG. 6). The routines may be included as part of any of the modules described in relation to FIGS. 1, 2, 6 or as part of a module that is external to the system illustrated by FIGS. 1, 2, and 6. For example, the methods may be part of a browser application or an application running on the computing device(s) as a plug-in or other module of the browser application. Further, the methods may be employed as "software-as-a-service" to provide a computing device with access to the quote tool 110.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments may be implemented, using either current technology or technology developed after the filing date of this patent, which would still fall within the scope of the claims.

Upon reading this disclosure, those of skill in the art will appreciate still additional alternative structural and functional designs for System And Method For Determining A Standard Status Message. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications may be made without departing from the spirit and scope of the invention. It is therefore intended to cover in the appended claims all such changes and modifications that are within the scope of this invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations in a specialized manner. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to homeowners insurance policies, it should be appreciated that an insurance provider may offer or provide one or more different types of insurance policies. Other types of insurance policies may include, for example, auto insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "customer," "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force (i.e., the policyholder is enrolled).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method for creating and presenting multiple insurance product offerings, the method comprising:

receiving, at a hardware server, a first data signal including customer demographic information and property information, wherein the first data signal is received via wired or wireless communication and/or a computer network and originates from a client computing device, and the property information corresponds to a property;

storing the customer demographic information and property information in a data structure comprising a database that is communicatively coupled to the hardware server;

determining two or more alternative insurance product offerings for insuring the property based upon the stored customer demographic information and property information, wherein the two or more alternative insurance product offerings include a first insurance product offering and a second insurance product offering that share a set of coverage categories;

for at least one coverage category of the shared set of coverage categories, determining, at the hardware server, one or more differences between the first insurance product offering and the second insurance product offering, the one or more differences corresponding to a subset of the set of coverage categories; and sending, from the hardware server and via wired or wireless communication and/or the computer network, a second data signal including data to enable the client computing device to display a graphic representation of the two or more alternative insurance product offerings, the graphic representation including (i) for each category of the set of coverage categories, a coverage amount for the category under the first insurance product offering and a coverage amount for the category under the second insurance product offering, and (ii) for each category of the subset of coverage categories, a difference indicator indicating that a difference exists between the first insurance product offering and the second insurance product offering with respect to that category.

2. The computer-implemented method of claim 1, further comprising receiving, at the hardware server, a third data signal including data to enable the hardware server to execute one or more instructions to bind a customer to one of the two or more insurance product offerings.

3. The computer-implemented method of claim 2, wherein the data to enable the hardware server to execute one or more instructions to bind the customer to one of the two or more insurance product offerings includes payment information and data indicating a selection of one of the two or more alternative insurance product offerings.

4. The computer-implemented method of claim 3, wherein receiving, at the hardware server, the third data signal including data to enable the hardware server to execute one or more instructions to bind the customer to one of the two or more alternative insurance product offerings includes associating both the stored customer demographic information and the property information with the data to enable the hardware server to execute one or more instructions to bind the customer to one of the two or more alternative insurance product offerings.

5. A computer system for creating and presenting multiple insurance product offerings comprising:

one or more processors;

one or more communication modules adapted to communicate data; and a program memory coupled to the one or more processors and storing executable instructions that when executed by the one or more processors cause the computer system to:

receive, at a hardware server, a first data signal including customer demographic information and property information, wherein the first data signal is received via a computer network and originates from a client computing device, and the property information corresponds to a property;

store the customer demographic information and property information in a data structure comprising a database that is communicatively coupled to the hardware server;

determine two or more alternative insurance product offerings for insuring the property based upon the stored customer demographic information and property information, wherein the two or more alternative insurance product offerings include a first insurance product offering and a second insurance product offering that share a set of coverage categories;

for at least one coverage category of the shared set of coverage categories, determine one or more differences between the first insurance product offering and the second insurance product offering, the one or more differences corresponding to a subset of the set of coverage categories; and send, from the hardware server and via the computer network, a second data signal including data to enable the client computing device to display a graphic representation of the two or more alternative insurance product offerings, the graphic representation including (i) for each category of the set of coverage categories, a coverage amount for the category under the first insurance product offering and a coverage amount for the category under the second insurance product offering, and (ii) for each category of the subset of coverage categories, a difference indicator indicating that a difference exists between the first insurance product offering and the second insurance product offering with respect to that category.

6. The computer system of claim 5, further comprising an instruction to cause the computer system to receive, at the hardware server, a third data signal including data to enable the hardware server to execute one or more instructions to bind a customer to one of the two or more alternative insurance product offerings.

7. The computer system of claim 6, wherein the data to enable the hardware server to execute one or more instructions to bind the customer to one of the two or more alternative insurance product offerings includes payment information and data indicating a selection of one of the two or more alternative insurance product offerings.

8. The computer system of claim 7, wherein the instruction to receive, at the hardware server, the third data signal including data to enable the hardware server to execute one or more instructions to bind the customer to one of the two or more alternative insurance product offerings includes an instruction to associate both the stored customer demographic information and the property information with the data to enable the hardware server to execute one or more instructions to bind the customer to one of the two or more alternative insurance product offerings.

9. A computer-implemented method of visually presenting multiple home owners insurance quotes simultaneously on a user interface, the method comprising:

causing, via one or more remote processors, a display screen capable of collecting home information associated with a home from a user to be presented on a user interface of a client computing device;

receiving, at or by the one or more remote processors, a request for a homeowners insurance quote from the user for a homeowners insurance policy covering the home via wired or wireless communication, or data transmission, from the client computing device;

in response to the user requesting the homeowners insurance quote via the user interface, generating, at or by the one or more remote processors, (1) a first summary associated with a first quote for a first homeowners insurance product covering the home, and (2) a second summary associated with a second quote for an alternative, second homeowners insurance product covering the home, wherein the first homeowners insurance product and the second homeowners insurance product share a set of coverage categories;

for at least one coverage category of the shared set of coverage categories, determining, at or by the one or more remote processors, one or more differences between the first homeowners insurance product and the second homeowners insurance product, the one or more differences corresponding to a subset of the set of coverage categories; and causing, by the one or more remote processors, a graphic representation including (1) the first summary associated with the first quote for the first homeowners insurance product covering the home, and (2) the second summary associated with the second quote for the second homeowners insurance product covering the home, to be presented on the user interface of the client computing device to facilitate side-by-side comparison, review, or approval of the first and second homeowners insurance products covering the home by the user, wherein the graphic representation includes (i) for each category of the set of coverage categories, a coverage amount for the category under the first homeowners insurance product offering and a coverage amount for the category under the second homeowners insurance product offering, and (ii) for each category of the subset of coverage categories, a difference indicator indicating that a difference exists between the first homeowners insurance product offering and the second homeowners insurance product offering with respect to that category.

10. The computer-implemented method of claim 9, the first and second summaries include monthly pricing or premium amount information associated with the first and second homeowners insurance products, respectively.

11. The computer-implemented method of claim 9, the first and second summaries include (a) discount information, and (b) insurance coverage associated with the first and second homeowners insurance products, respectively.

12. The computer-implemented method of claim 9, the first and second summaries include (a) discount information, and (b) insurance coverage associated with the first and second homeowners insurance products, respectively, and (3) an icon that allows the user to modify the first and second homeowners insurance products, respectively.

* * * * *